Jan. 17, 1950

W. H. McCOLLISTER 2,495,118

CENTRAL SCREW OPERATED MULTIPLE ARM TIRE REMOVING APPARATUS

Filed Nov. 15, 1945

INVENTOR
WILLIAM H. McCOLLISTER
BY
Clyd Frye
ATTORNEYS

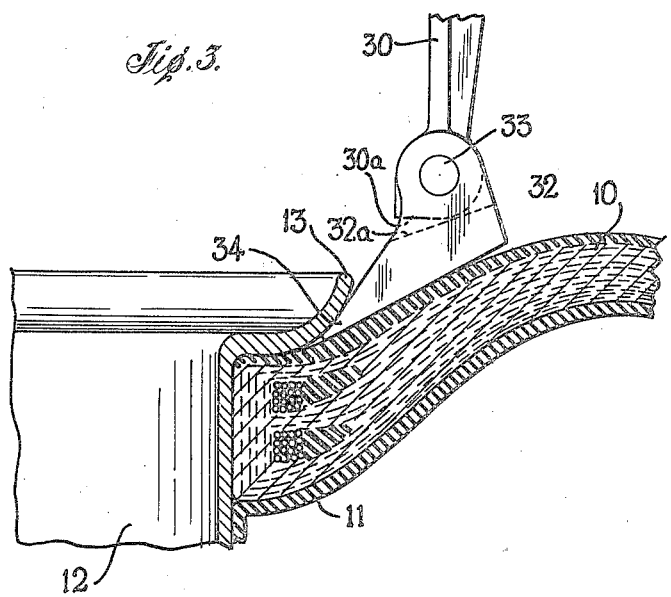
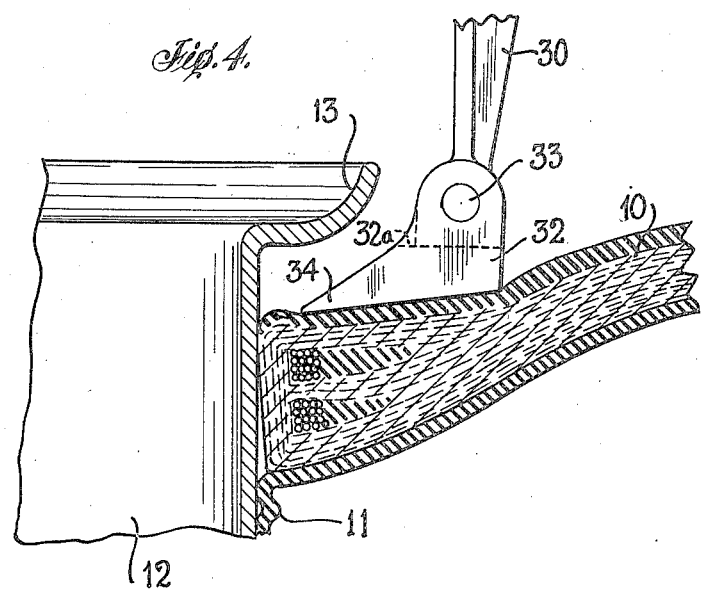

Patented Jan. 17, 1950

2,495,118

UNITED STATES PATENT OFFICE 2,495,118

CENTRAL SCREW OPERATED MULTIPLE ARM TIRE REMOVING APPARATUS

William H. McCollister, Akron, Ohio, assignor to The Firestone Tire & Rubber Company, Akron, Ohio, a corporation of Ohio Application November 15, 1945, Serial No. 628,872

1 Claim. (Cl. 157—1.2)

This invention relates to tire removing apparatus, and more especially it relates to apparatus for removing relatively large pneumatic tires, such as are used on busses, trucks, and trailers, from the tire-rims on which they are mounted.

The apparatus is of especial utility for removing tires of the character mentioned from the so called "flat base" rims. Such rims have a fixed flange on one lateral margin thereof and a removable flange on the opposite margin. To remove a tire therefrom, the removable flange is first removed, and then the bead portion of the tire abutting the opposite or fixed flange is forced away from the latter and moved transversely across the rim until it engages the other bead portion of the tire, both bead portions then being forced off that side of the rim from which the removable flange has been removed. Due to water and snow, tire beads frequently become rusted onto rims and are difficult to displace. Also heat generated during braking frequently is conducted to the tire rims and fuses the tire beads to the rims. Furthermore, due to the fact that flat base rims cannot be tapered or sloped at the bead seats to effect wedging of the tire beads thereon, it is necessary that the tire beads normally have a tight fit on the rims so that there is no relative movement between tire and rim due to strains set up during use.

The chief objects of the invention are to provide a novel and useful device for removing tires from flat base rims; to provide a device of the character mentioned that may be operated by manual effort, yet has such mechanical advantage that adequate power is provided for removing a tire; and to provide a device for the purpose mentioned that is adjustable for use on tires of different bead diameters. Other objects will be manifest as the description proceeds.

Of the accompanying drawings:

Fig. 3 is detail sectional view, on a larger scale, showing a work-engaging element of the apparatus as it appears when initially engaging the work; and Fig. 4 is a view similar to Fig. 3 at a subsequent phase of operation.

Figure 1:
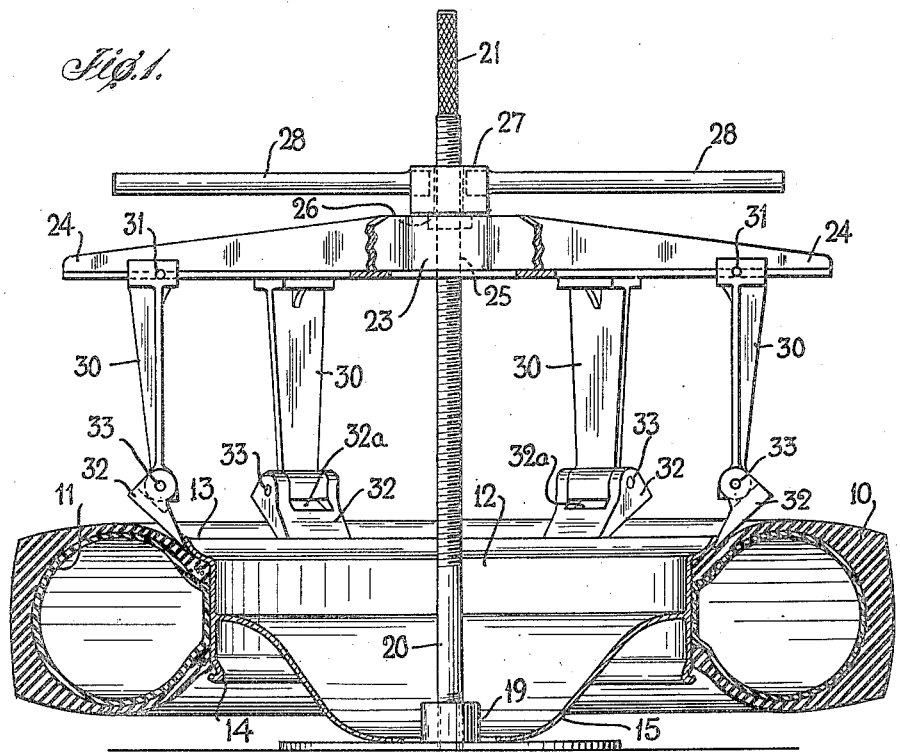
Fig. 1 is a side elevation of apparatus embodying the invention, a part thereof being in section on the line 1—1 of Fig. 2, said apparatus being in operative engagement with a tire rim and tire thereon, both shown in diametric section.
Figure 2:
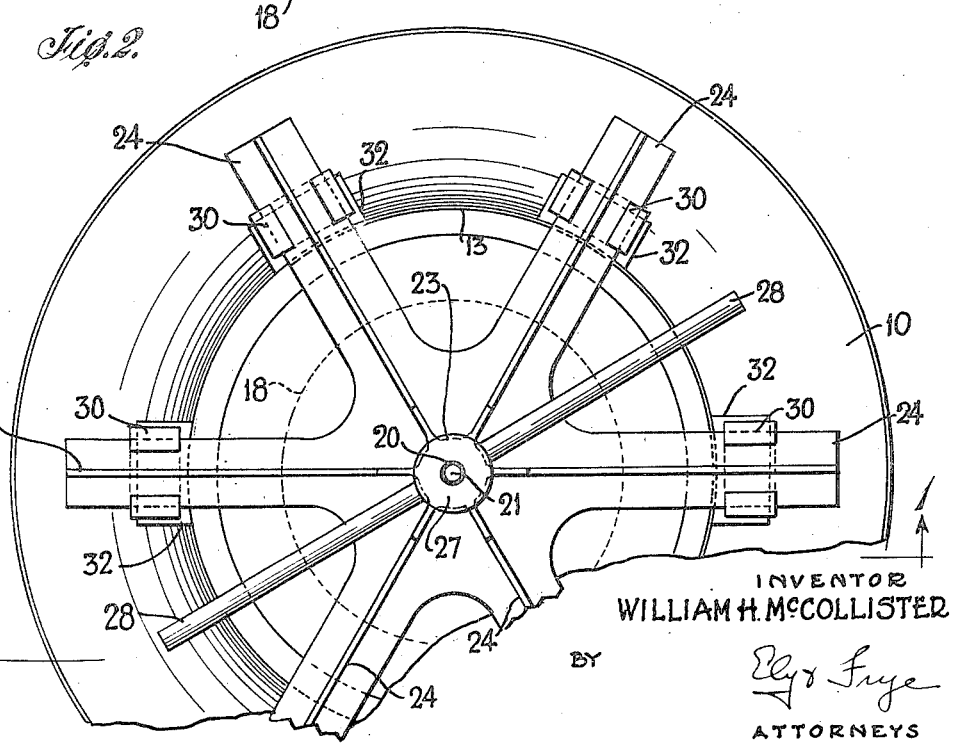
Fig. 2 is a fragmentary plan view of the structures shown in Fig. 1.

Referring to the drawing, there is shown a tire 10 and inner tube 11 that are mounted upon a flat base tire rim 12, the latter formed on one margin with the usual fixed rim-flange 13, and on its other margin formed with the usual gutter 14 for receiving a removable rim-flange or a locking ring (not shown) that are removed when a tire is to be mounted on or removed from the rim. The rim 12 illustrated is formed integral with a wheel disc 15, but it will be understood that this is immaterial, and that the apparatus is adapted to remove tires from all types of flat base rims. The rim is positioned with its fixed flange 13 uppermost during the operation of removing the tire 10 from the rim.

The tire removing apparatus comprises a base structure 18 shown herein as a circular disc formed with an upstanding axial boss 19 that is threaded to receive the lower end portion of a vertically positioned spindle 20. The base structure 18 constitutes a support for the work to hold the rim 12 at a somewhat elevated position as shown so that the tire 10 may be forced off the downwardly presented side of the rim. In the illustrative embodiment of the invention shown in Fig. 1, the wheel disc 15 rests upon the base 18, with the boss 19 and spindle 20 projecting through the usual axial opening in the wheel disc, the wheel disc being sufficiently dished to support the rim 12 at a suitable elevation. However, in cases where the rim 12 is a demountable rim and not integral with a wheel disc, a modified base structure (not shown) will be provided, which structure will be of greater height than the base 18 and will engage the gutter portion 14 of the rim, inwardly of the tire-seating surface thereof. The spindle 20 is threaded throughout the major portion of its length, and at its upper end is formed with a knurled hand-grip portion 21.

Positioned upon the spindle 20 is a spider 23 herein shown as having six radial arms 24 that are joined to an axial hub. The latter is formed with an axial bore 25 through which the spindle 20 freely extends, the upper end of said bore being counterbored to provide a socket in which a thrust bearing 26 is mounted, said thrust bearing extending slightly above the top of the spider-hub. Threaded onto the spindle 20 above the spider 23 is a nut 27, which nut is provided with radially extending arms 28, 28 that provide adequate leverage for manually turning the nut 27, to move the latter axially of the spindle 20. The spider carries the elements that engage the work, and in operation the nut is turned down against the thrust bearing 26 to urge the spider downwardly.

Carried by each arm 24 of the spider 23 is a downwardly projecting bracket or leg 30. The legs 30 are slidably mounted on the respective arms 24 so as to be adjustable longitudinally thereof, radially of the spindle 20, each leg being provided with a set screw 31 engageable with its arm 24 for holding the leg in adjusted position. Loosely pivotally suspended from the lower end of each leg 30 is a foot 32, each foot being formed with a pair of apertured ears that engage a pivot pin 33 mounted in the leg. Each foot is formed with a flat wedge-shaped toe portion 34, and the weight of the shoe is so distributed that said toe portion normally is inclined obliquely downwardly and toward the axis of the apparatus, as is most clearly shown in Fig. 1. The legs 30 are so positioned that when the spider 23 is lowered axially of the spindle 20 the toes 34 of the feet 32 will engage the upwardly presented bead portion of the tire 10 immediately outwardly of the perimeter of rim-flange 13.

Downward movement of the legs 30 relatively of the tire 10, after the toe-portions of the feet 32 engage the tire, cause said feet to move angularly about their pivot pins 33. Such angular movement of the feet is determinately limited, and to this end the lower end portion of each leg 30, which is disposed between the apertured ears of a foot 32, is formed with a flat face 30a, which face is engaged by a flat surface 32a formed on the foot 32, between the ears thereof, when the foot has moved angularly a determinate distance as described, and as is most clearly shown in Fig. 4. When the surfaces 30a, 32a of leg and shoe are in abutting relation, the latter is substantially in horizontal position, its bottom face being but slightly inclined downwardly toward the axis of the apparatus.

In the operation of the apparatus, a tire 10 and rim 12 are mounted upon the base 18 while the spider 23 is elsewhere than in the position shown. After the tire is in position, the spider 23 is lowered onto the spindle 20, at which time the toes 34 of the feet 32 will enter between the tire bead and the rim-flange 13 as shown in Figs. 1 and 3 and thus support the spider. The nut 27 is then threaded onto the spindle 20 and forcibly moved against the spider 23, thus moving the latter, and the legs 30 carried thereby, downwardly toward the tire. Because downward movement of the feet 32 initially is obstructed by reason of the engagement of the toes thereof with the work, it will be seen that downward movement of the pivot pins 33 results in angular or rotary movement of the feet around said pivot pins. Because of the initial oblique positions of the feet 32, such angular or rotary movement thereof causes their toe portions 34 to move radially inwardly of the apparatus, whereby they penetrate farther between the tire bead and the rim-flange 13, and because of their wedge shape, break the adhesion therebetween and initiate separation thereof. This continues until the legs 30 and feet 32 attain the relative positions shown in Fig. 4, wherein the flat surfaces 30a, 32a of the legs and feet are in juxtaposition. The arrangement is such as to prevent further relative movement between legs and feet and to relieve the pivot pins 33 of shearing strains. Continued downward movement of the spider 23 and legs 30 causes the feet 32 to force the bead portion of the tire transversely of the rim 12 until it encounters the other bead portion of the tire, whereby both tire beads are subjected to downwardly directed pressure, and are forced off the tire rim on the gutter side thereof. This completes a cycle of operation.

From the foregoing it will be seen that the invention enables a single operator to apply sufficiently strong pressure to a tire to force the latter off a tire rim, and that said pressure is applied at several points so that at no point is the strain sufficient to damage the tire. The apparatus is adjustable to tire rims of different diameters, it is economical in cost and in operation, and achieves the other objects set out in the foregoing statement of objects.

Modification may be resorted to without departing from the spirit of the invention, or the scope thereof as defined by the appended claim.

What is claimed is:

Tire removing apparatus of the character described comprising a base structure adapted to support a tire rim and tire thereon on a vertical axis at an elevated position, a suspension member positionable above the tire, means engaging said member and base structure adapted to force said suspension member downwardly toward said base, a plurality of legs slidably mounted on and suspended from the suspension member, each leg having a foot pivotally mounted on its lower end, the bottom end surface of said leg having a flat substantially horizontal surface, each said foot being formed at its top portion with a slot having a substantially flat bottom, said ends of said legs extending into said slots and being pivotally connected to the sides thereof, said pivotal connection being so disposed intermediate the toe and heel of said foot that the center of gravity of the foot is located radially inwardly of the point of suspension whereby said foot normally inclines downwardly and radially inwardly, the radially outward portion of said legs being rounded, the toes of said feet being engageable with the tire adjacent the rim flange.

WILLIAM H. McCOLLISTER.

REFERENCES CITED

The following references are of record in the file of this patent:

UNITED STATES PATENTS

| Number | Name | Date |
| --- | --- | --- |
| 1,564,496 | Staugaard | Dec. 8, 1925 |
| 1,641,083 | Hite | Aug. 30, 1927 |
| 1,724,813 | Weaver | Aug. 13, 1929 |
| 1,729,861 | Anderson | Oct. 1, 1929 |
| 2,373,975 | Plumeau | Apr. 17, 1945 |
| 2,406,996 | Colley | Sept. 3, 1946 |
| 2,423,652 | Kelley | July 8, 1947 |